April 14, 1936. H. A. TAPLIN 2,037,156
NEEDLE BEARING SPRING END MOUNTING MEANS
Filed June 15, 1935 3 Sheets-Sheet 1
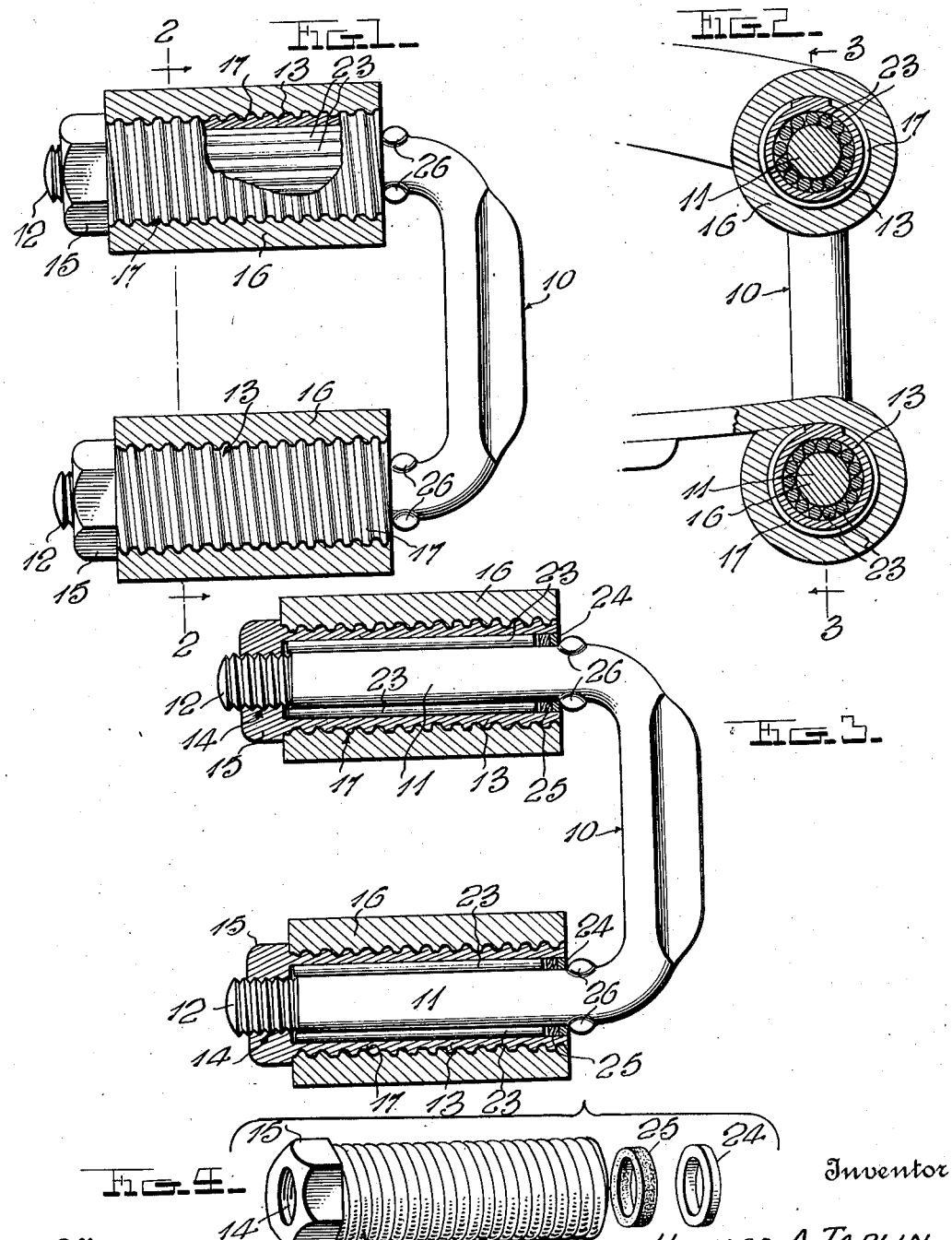
Witness
H. Woodard
Inventor
HOWARD. A. TAPLIN
By H. B. Wilson &co.
Attorneys.

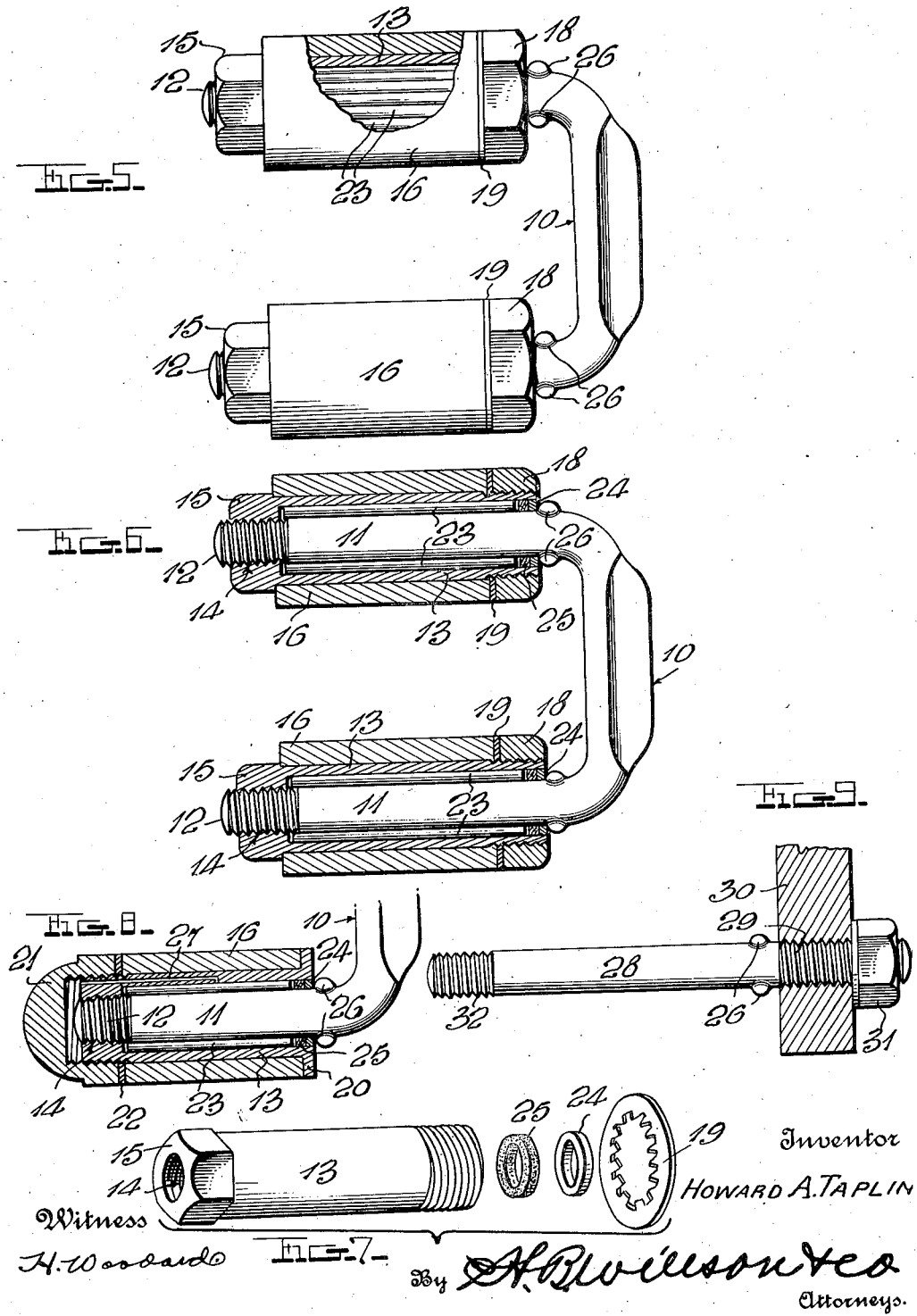

April 14, 1936.  H. A. TAPLIN  2,037,156
NEEDLE BEARING SPRING END MOUNTING MEANS
Filed June 15, 1935    3 Sheets-Sheet 3
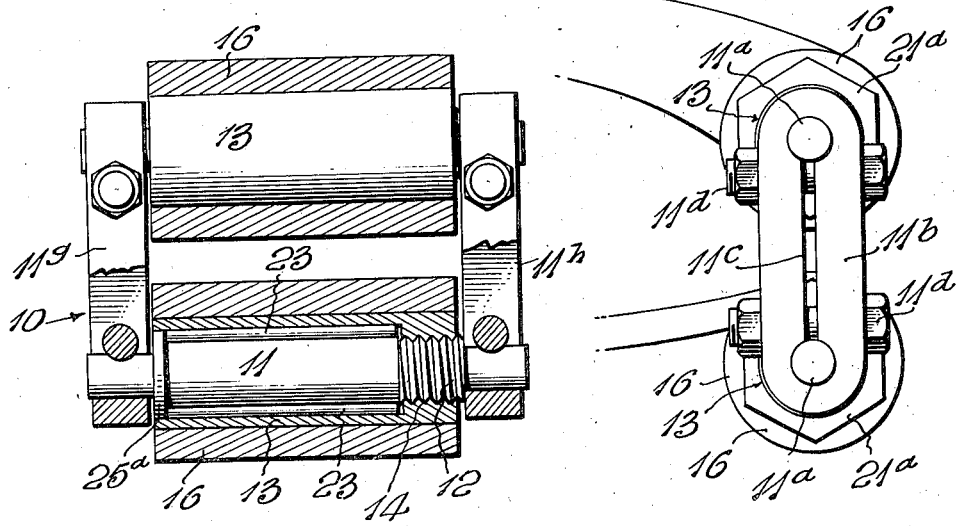
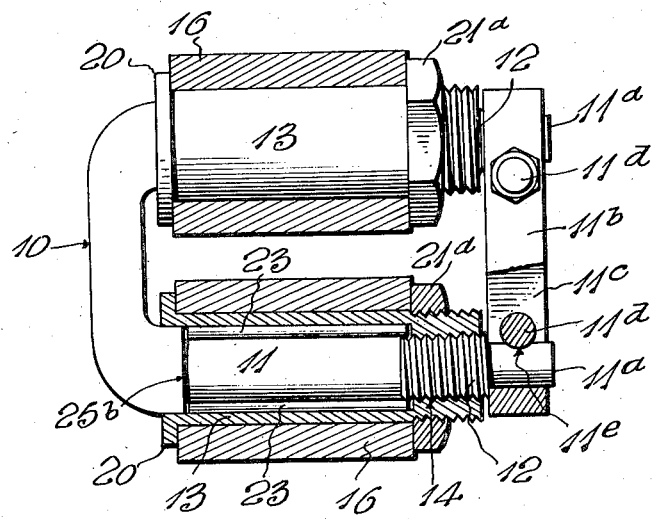
Inventor
HOWARD A. TAPLIN Patented Apr. 14, 1936

2,037,156

UNITED STATES PATENT OFFICE 2,037,156

NEEDLE BEARING SPRING END MOUNTING MEANS

Howard A. Taplin, Kansas City, Mo.

Application June 15, 1935, Serial No. 26,832

16 Claims. (Cl. 267—54)

The invention relates to pivotal mounting means for the ends of vehicle springs and it aims to provide a new and improved construction provided with the highly advantageous needle bearings.

In carrying out the above end, a further object is to provide a construction which requires no change in the eyes of the springs or the clamp-carried eyes.

A further aim is to provide a construction in which a cap or "acorn" nut which is instrumental in securing a bushing sleeve in a spring-carried or frame-carried eye, may act also as means for forcing lubricant to the needle bearings.

Yet another object is to provide a construction which is simple and inexpensive, easy to manufacture, and efficient and durable.

With the foregoing in view, the invention resides in the novel subject matter hereinafter described and claimed, description being accomplished by reference to the accompanying drawings.

Fig. 1 is an elevation partly in section showing a spring shackle constructed in accordance with the invention.

Fig. 2 is a vertical sectional view on line 2—2 of Fig. 1.

Fig. 3 is a vertical sectional view on line 3—3 of Fig. 2.

Fig. 4 is a perspective view of the bushing sleeve and the washers which close its inner end.

Fig. 5 is a view similar to Fig. 1 but showing a different construction.

Fig. 6 is a sectional view of the device shown in Fig. 5.

Fig. 7 is a perspective view showing the bushing sleeve and the washers used in Figs. 5 and 6.

Fig. 8 is a detail view similar to the lower portion of Fig. 6 but showing a still further form of construction.

Fig. 9 is an elevation partly in section showing a pivot arm which may be used for instance to connect the front end of a rear spring with the frame.

Fig. 10 is a sectional view partly in elevation showing another modification.

Fig. 11 is a view similar to Fig. 1 but showing a still further variation.

Fig. 12 is a side elevation of the construction shown in Fig. 11.

In the drawings above briefly described, 10 denotes a substantially C-shaped shackle having parallel cylindrical pivot arms 11, said arms being provided with threaded terminals 12. Cylindrical bushing sleeves 13 surround the pivot arms 11 and have their major portions in spaced concentric relation therewith, the outer ends of said bushing sleeves being internally contracted as shown at 14, and threaded upon the threaded terminals 12.

In most forms of construction, the outer end of each sleeve 13 is provided with an integral wrench-engaging head 15, these heads being positioned to abut one end of the eyes 16 in which the two sleeves are received. In the form of construction shown in Figs. 1 to 4, each sleeve 13 is provided with coarse external screw threads 17 to engage corresponding threads in the eyes 16, the wrench-engaging heads 15 being instrumental in threading the sleeves into the eyes and in threading said sleeves onto the terminals 12 of the pivot arms 11. By abutting the eyes, the heads 15 limit the insertion of the sleeves 13 which are tightly held in place by friction.

In the construction shown in Figs. 5 to 8 and 11, each sleeve 13 has a free fit within the eye 16. In Figs. 5 and 6, the head 15 abuts the outer end of the eye and a nut 18 is threaded on the inner end of the sleeve, a suitable lock washer 19 being interposed between said nut and the inner end of the eye.

In Figs. 8 and 11, the inner end of the sleeve 13 is provided with an integral head 20 abutting the inner end of the eye 16. In Fig. 8, a cap or "acorn" nut 21 is threaded on the outer end of said sleeve, a lock washer 22 being disposed between the two, but in Figs. 11 and 12, ordinary nuts 21ª are threaded on the outer ends of the bushing sleeves 13 and abut the outer ends of the eyes 16. In these views, the arms 11 are provided with projecting studs 11ª at their free ends, and said studs are conneced by a link 11ᵇ for stability. This link is preferably longitudinally split between its stud receiving openings as seen at 11ᶜ, and contracted upon said studs by bolts 11ᵈ which pass through the link and engage shallow grooves 11ᵉ in the studs 11ª.

In Fig. 10, the bushing sleeves 13 are pressed into the eyes 16 and the pivot arms 11 are rigidly connected at their ends by links 11ᵍ and 11ʰ identical with the link 11ᵇ. The link 11ᵍ and the bearing arms 11 may be considered as forming the C-shaped shackle 10 in this view.

Needle bearings 23 are positioned in the space between each bushing sleeve 13 and pivot arm 11 surrounded thereby, said space being of course packed with lubricant. The inner end of this space is tightly closed, in most forms of construction by means of a metal washer 24 and a packing washer 25 both pressed snugly into the inner end of the sleeve 13. When the washers 24 and 25 are used, each pivot arm 11 is provided with integral lugs 26, said lugs abutting the outer side of the metal washer 24 and holding it in place. In Fig. 10, an integral enlargement or flange 25ª on the bearing arm 11 closes the inner end of the sleeve 13, and in Fig. 12, an integral enlargement 25ᵇ on the shackle 10 performs the same duty.

The nut 21 (Fig. 8) may contain lubricant if desired, and one of the elements, preferably the sleeve 13, may be provided with a lubricant port 27 leading from the interior of this nut into the needle bearing space. By removing the nut 21 and partially filling it with lubricant, and then threading it back upon the sleeve 13, the lubricant supply will be replenished.

In Fig. 9, I illustrate a cylindrical pivot arm 28 corresponding to any of the pivot arms 11 but threaded at 29 for passage through a frame part 30 and for engagement with a lock nut 31. Any of the constructions above described may be used with the bearing arm 28, the outer end of the sleeve 13 being, of course, threaded upon the threaded terminal 32 of said bearing arm. This construction may be used wherever advisable, for instance to connect the front end of a rear spring with the frame.

From the foregoing, taken in connection with the accompanying drawings, it will be seen that novel provision has been made for carrying out the objects of the invention. Preferred details have been shown but within the scope of the invention as claimed, variations may be made.

I claim:—

1. A needle bearing spring end mounting means comprising a C-shaped shackle having parallel cylindrical pivot arms provided with threaded terminals, two cylindrical bushing sleeves for reception in two eyes respectively, said sleeves surrounding said pivot arms and having their major portions in spaced concentric relation therewith, the outer ends of said sleeves being internally contracted and threaded on said threaded arm terminals, needle bearings in the spaces between said pivot arms and said sleeves, closing means for the inner ends of said spaces, and means for holding said sleeves within the eyes.

2. A needle bearing spring end mounting means comprising a C-shaped shackle having parallel cylindrical pivot arms provided with threaded terminals, two cylindrical bushing sleeves for reception in two eyes respectively, said sleeves surrounding said pivot arms and having their major portions in spaced concentric relation therewith, the outer ends of said sleeves being internally contracted and threaded on said threaded arm terminals, needle bearings in the spaces between said pivot arms and said sleeves, washers closing the inner ends of said spaces and fitting snugly within said sleeves, integral lugs on said pivot arms abutting said washers to hold them in place, and means for holding said sleeves within the eyes.

3. A needle bearing spring end mounting means comprising a cylindrical pivot arm having a threaded terminal, a cylindrical eye-engaging bushing sleeve surrounding said pivot arm and having its major portion in spaced concentric relation therewith, the outer end of said sleeve being internally contracted and threaded on said threaded arm terminal, needle bearings in the space between said pivot arm and said sleeve, means for closing the inner end of said space, and means for holding said sleeve in its receiving eye.

4. A needle bearing spring end mounting means comprising a cylindrical pivot arm having a threaded terminal, a cylindrical eye-engaging bushing sleeve surrounding said pivot arm and having its major portion in spaced concentric relation therewith, the outer end of said sleeve being internally contracted and threaded on said threaded arm terminal, needle bearings in the space between said pivot arm and said sleeve, a washer closing the inner end of said space and fitting snugly into said sleeve, an integral lug on said pivot arm abutting said washer to hold the same in place, and means for holding said sleeve in its receiving eye.

5. A needle bearing spring end mounting means comprising a C-shaped shackle having parallel cylindrical pivot arms provided with threaded terminals, two cylindrical bushing sleeves externally threaded to engage two eyes respectively, said sleeves surrounding said pivot arms and having their major portions in spaced concentric relation therewith, the outer ends of said sleeves being internally contracted and threaded upon said threaded arm terminals, said outer ends of said sleeves being provided with enlarged wrench-engaging heads to abut said eyes, needle bearings in the spaces between said pivot arms and sleeves, and closing means for the inner ends of said spaces.

6. A needle bearing spring end mounting means comprising a C-shaped shackle having parallel cylindrical pivot arms provided with threaded terminals, two cylindrical bushing sleeves externally threaded to engage two eyes respectively, said sleeves surrounding said pivot arms and having their major portions in spaced concentric relation therewith, the outer ends of said sleeves being internally contracted and threaded upon said threaded arm terminals, said outer ends of said sleeves being provided with enlarged wrench-engaging heads to abut said eyes, needle bearings in the spaces between said pivot arms and sleeves, washers closing the inner ends of said spaces and fitting snugly into said sleeves, and integral lugs on said pivot arms abutting said washers to hold them in place.

7. A needle bearing spring end mounting means comprising a cylindrical pivot arm provided with a threaded terminal, a cylindrical bushing sleeve externally threaded to engage a receiving eye, said sleeve surrounding said pivot arm and having its major portion in spaced concentric relation therewith, the outer end of said sleeve being internally contracted and threaded on said threaded arm terminal, said outer end of said sleeve being provided with an enlarged wrench-engaging head to abut said eye, needle bearings in the space between said pivot arm and sleeve, and means for closing the inner end of said space.

8. A needle bearing spring end mounting means comprising a cylindrical pivot arm provided with a threaded terminal, a cylindrical bushing sleeve externally threaded to engage a receiving eye, said sleeve surrounding said pivot arm and having its major portion in spaced concentric relation therewith, the outer end of said sleeve being internally contracted and threaded on said threaded arm terminal, said outer end of said sleeve being provided with an enlarged wrench-engaging head to abut said eye, needle bearings in the space between said pivot arm and sleeve, a washer closing the inner end of said space and fitting snugly within said sleeve, and an integral lug on said pivot arm abutting said washer to hold the same in place.

9. A needle bearing spring end mounting means comprising a C-shaped shackle having parallel cylindrical pivot arms provided with threaded terminals, two cylindrical bushing sleeves for reception in two eyes respectively, said sleeves surrounding said pivot arms and having their major portions in spaced concentric relation therewith, the outer ends of said sleeves being internally contracted and threaded on said threaded arm terminals, needle bearings in the spaces between said pivot arms and said sleeves, closing means for the inner ends of said spaces, heads on one end of said sleeves to abut said eyes, and nuts threaded on the other ends of said sleeves to abut said eyes.

10. A needle bearing spring end mounting means comprising a cylindrical pivot arm having a threaded terminal, a cylindrical eye-engaging bushing sleeve surrounding said pivot arm and having its major portion in spaced concentric relation therewith, the outer end of said sleeve being internally contracted and threaded on said threaded arm terminal, needle bearings in the space between said pivot arm and said sleeve, closing means for the inner end of said space, a head on one end of said sleeve to abut the sleeve-receiving eye, and a nut threaded on the other end of said sleeve to abut said eye.

11. A needle bearing spring end mounting means comprising a cylindrical pivot arm having a threaded terminal, a cylindrical eye-engaging bushing sleeve surrounding said pivot arm and having its major portion in spaced concentric relation therewith, the outer end of said sleeve being internally contracted and threaded on said threaded arm terminal, needle bearings in the space between said pivot arm and said sleeve, closing means for the inner end of said space, a head on the inner end of said sleeve to abut the sleeve-receiving eye, and a cap nut threaded on the other end of said sleeve to abut said eye, said cap nut being adapted to contain lubricant, one of the elements being provided with a lubricant port from the interior of said cap nut into the aforesaid space.

12. A structure as specified in claim 1; together with integral studs on the free ends of said bearing arms, and a link connecting said studs and having openings receiving the same.

13. A structure as specified in claim 1; together with integral studs on the free ends of said bearing arms, and a link connecting said studs and having openings receiving the same, said link being longitudinally split between said openings and having bolts for contracting it upon said studs.

14. A structure as specified in claim 1; said closing means consisting of integral enlargements on said bearing arms fitting into said spaces.

15. A structure as specified in claim 3; said closing means consisting of an integral enlargement on said bearing arm fitting into said space.

16. A needle bearing spring end mounting means comprising a C-shaped shackle having parallel cylindrical pivot arms, two cylindrical bushing sleeves for reception in two eyes respectively, said bushing sleeves surrounding said pivot arms and having their major portions in spaced concentric relation therewith, needle bearings in the spaces between said pivot arms and bushing sleeves, interengaged screw threads on one end of said pivot arms and one end of said bushing sleeves, closing means for the ends of said spaces remote from said screw threads, and means for holding said bushing sleeves within the eyes.

HOWARD A. TAPLIN.